(12) United States Patent
Natarajan et al.

(10) Patent No.: US 10,339,514 B2
(45) Date of Patent: Jul. 2, 2019

(54) MOBILE RETAIL SYSTEMS AND METHODS OF DISTRIBUTING AND STOCKING THE MOBILE RETAIL SYSTEMS

(71) Applicant: Walmart Apollo, LLC, Bentonville, AR (US)

(72) Inventors: Chandrashekar Natarajan, San Ramon, CA (US); Donald R. High, Noel, MO (US); Atikhun Unahalekhaka, Boston, MA (US)

(73) Assignee: Walmart Apollo, LLC, Bentonville, AR (US)

( * ) Notice: Subject to any disclaimer, the term of this patent is extended or adjusted under 35 U.S.C. 154(b) by 154 days.

(21) Appl. No.: 15/335,841

(22) Filed: Oct. 27, 2016

(65) Prior Publication Data

US 2017/0124547 A1 May 4, 2017

Related U.S. Application Data

(60) Provisional application No. 62/248,898, filed on Oct. 30, 2015.

(51) Int. Cl.
*G06F 3/01* (2006.01)
*G06F 3/16* (2006.01)
(Continued)

(52) U.S. Cl.
CPC ....... *G06Q 20/202* (2013.01); *G06Q 10/0836* (2013.01); *G06Q 20/18* (2013.01);
(Continued)

(58) Field of Classification Search
CPC .......... G06F 17/00; G06F 9/10; G06F 11/002; G06F 3/107; G06F 3/167; G06Q 20/202;
(Continued)

(56) References Cited

U.S. PATENT DOCUMENTS 4,270,319 A * 6/1981 Spasojevic ............ B60P 3/0257
296/22
7,261,511 B2 * 8/2007 Felder ...................... B23Q 7/10
414/331.07

(Continued)

OTHER PUBLICATIONS

(Ata, A. A., "Gantry robotic cell for automatic storage and retrieval system", University of Maribor, Nov. 2009, Abstract) (Year: 2009).*
(Continued)

*Primary Examiner* — Florian M Zeender
*Assistant Examiner* — Vanessa Deligi
(74) *Attorney, Agent, or Firm* — Fitch, Even, Tabin & Flannery LLP (57) ABSTRACT

In some embodiments, systems, apparatuses and methods are provided to enhance customer service through the distribution of mobile sales vehicles comprising: an engine and a drivetrain; a point of sales system; product storage storing pre-selected products selected in response to an evaluation of location demographic information, and in response to an evaluation of population demographic information, wherein the pre-selected products comprise a sub-set of potential products available from a retail entity operating the sales vehicle; and a product distribution system coupled with the point of sales system and comprising a control circuit configured to authorize access by a customer to one or more products stored in the product storage and purchased by the customer.

18 Claims, 4 Drawing Sheets

(51) Int. Cl.
*G07F 9/10* (2006.01)
*H04W 4/35* (2018.01)
*G06Q 10/08* (2012.01)
*G06Q 20/18* (2012.01)
*G06Q 20/20* (2012.01)
*G07F 11/00* (2006.01)
*H04L 29/06* (2006.01)
*H04W 12/08* (2009.01)

(52) U.S. Cl.
CPC ............ *G06Q 20/204* (2013.01); *G07F 9/10* (2013.01); *G07F 11/002* (2013.01); *H04L 63/102* (2013.01); *H04W 4/35* (2018.02); *H04W 12/08* (2013.01); *G06F 3/017* (2013.01); *G06F 3/167* (2013.01)

(58) Field of Classification Search
CPC .. G06Q 20/18; G06Q 20/204; G06Q 10/0836; G06Q 10/087; G06Q 50/28; G06Q 20/3224; G06Q 10/10; G06Q 30/02; G06Q 30/0205; G06Q 30/0201; G07F 9/10; G07F 9/023; G07F 11/165; G07F 9/02; G07F 11/00; G07F 11/16; H04L 63/102
USPC .......... 705/17; 700/214, 216, 219, 226, 228, 700/231, 232, 233, 236, 242
See application file for complete search history.

(56) References Cited

U.S. PATENT DOCUMENTS

| | | | | |
|---|---|---|---|---|
| 7,364,050 | B2* | 4/2008 | Guard | B60P 3/0257 221/131 |
| 8,204,624 | B2* | 6/2012 | Zini | G05B 19/41895 700/245 |
| 8,485,285 | B2* | 7/2013 | Ferrigni | B60P 3/20 180/2.1 |
| 9,373,149 | B2* | 6/2016 | Abhyanker | G06Q 50/28 |
| 9,406,084 | B2 | 8/2016 | Havas | |
| 9,428,336 | B2* | 8/2016 | Hagen | G07F 11/165 |
| 9,520,012 | B2* | 12/2016 | Stiernagle | G07F 9/023 |
| 2003/0149644 | A1* | 8/2003 | Stingel, III | G06Q 10/08 705/28 |
| 2005/0238465 | A1* | 10/2005 | Razumov | A47F 10/02 414/273 |
| 2006/0045674 | A1* | 3/2006 | Craven | B65G 1/02 414/277 |
| 2011/0313811 | A1* | 12/2011 | Urban | B60P 3/0257 705/7.25 |
| 2012/0104785 | A1* | 5/2012 | Hixson | B60P 3/0257 296/24.36 |
| 2012/0298688 | A1 | 11/2012 | Stiernagle | |
| 2013/0088323 | A1 | 4/2013 | Ryan | |
| 2013/0179303 | A1 | 7/2013 | Petrou | |
| 2013/0246270 | A1 | 9/2013 | Du | |
| 2013/0317921 | A1 | 11/2013 | Havas | |
| 2014/0331189 | A1* | 11/2014 | Lee | G06F 3/04883 715/863 |
| 2014/0365333 | A1 | 12/2014 | Hurewitz | |
| 2015/0006005 | A1 | 1/2015 | Yu | |
| 2015/0019354 | A1 | 1/2015 | Chan | |
| 2015/0100445 | A1 | 4/2015 | Johnson | |
| 2015/0186840 | A1 | 7/2015 | Torres | |
| 2017/0132393 | A1* | 5/2017 | Natarajan | G06F 19/3456 |
| 2017/0345084 | A1* | 11/2017 | Gordon | G06Q 30/0639 |
| 2018/0058864 | A1* | 3/2018 | Lection | G01C 21/3423 |
| 2018/0089773 | A1* | 3/2018 | Bryson | G01C 21/3438 |

OTHER PUBLICATIONS

Dreifuss, Emily; "Couleur"; https://prezi.com/fo88x558mzve/couleur/; Jun. 18, 2013; pp. 1-5.
Entrepreneur Press and Rich Mintzer; "Beyond the Food Truck: Six Ideas for Mobile Food Businesses"; http://www.entrepreneur.com/article/220401; Sep. 26, 2011; pp. 1-5.
Focus POS Systems; "Why Food Trucks Should Use POS Systems"; http://www.focuspos.com/why-food-trucks-should-use-pos-systems/; Aug. 20, 2015; pp. 1-5.
MacDonald, Christine; "From the Atlantic CityLab: The Food Truck Industrial Complex"; http://www.citylab.com/design/2011/10/foodtruckindustrialcomplex/331/; Oct. 21, 2011; pp. 1-6.
The Merchant Solutions; " POS System for Food Trucks"; https://www.themerchantsolutions.com/industries/food-trucks/; Aug. 20, 2015; pp. 1-6.
Warnke, Marian; "Hit-N-Run"; https://prezi.com/mbviy8q1jwvi/hitnrun/; Apr. 15, 2014; pp. 1-4.
PCT; App No. PCT/US2016/059042; International Search Report and Written Opinion dated Jan. 5, 2017.

* cited by examiner

MOBILE RETAIL SYSTEMS AND METHODS OF DISTRIBUTING AND STOCKING THE MOBILE RETAIL SYSTEMS

CROSS-REFERENCE TO RELATED APPLICATION

This application claims the benefit of U.S. Provisional Application No. 62/248,898, filed Oct. 30, 2015, which is incorporated herein by reference in its entirety.

TECHNICAL FIELD

This invention relates generally to retail facilities.

BACKGROUND

In modern retail environments, there is a need to improve the customer experience and/or convenience for the customer. In a shopping environment, it can be important that product inventory is readily available to customers. Further, the customer experience at the shopping facility can have significant effects on current sales. Providing a pleasant or improved customer experience can lead to customer satisfaction and repeat returns to the shopping location.

There are many ways to improve customer experience. For example, ready access to products can lead to increased customer visits and customer loyalty. The shopping facility can affect customer experience based in part on finding products of interest, access to a shopping facility, and/or congestion within the shopping facility. Accordingly, it can be advantageous to improve the customers' shopping experience.

BRIEF DESCRIPTION OF THE DRAWINGS

Disclosed herein are embodiments of systems, apparatuses and methods pertaining to enhancing customer experience through the distribution of mobile sales vehicles. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to provide customers with added convenience through the distribution of mobile retail systems that allow customers to quickly and easily purchase and/or retrieve products. Some embodiments provide mobile product sales vehicles that can temporarily be moved to one or more sales locations that are convenient to customers, such as near train stations, bus stations, freeway on-ramps and off-ramps, stadiums, parks, and other locations. Further, the products placed onto the sales vehicles can be coordinated to the intended sales location of each respective sales vehicle and/or products predicted to be purchased by customers predicted to shop at the sales vehicles at the respective locations. In some embodiments, the mobile sales vehicles may include an engine and a drivetrain enabling independent movement of the sales vehicle to different locations, one or more point of sales systems, product storage configured to store pre-selected products selected in response to an evaluation of location demographic information and evaluation of population demographic information, and one or more product distribution systems coupled with the point of sales system and comprising a control circuit configured to authorize access by a customer to one or more products stored in the product storage and purchased by the customer. The products selected and made available from the sales vehicle include a sub-set of potential products available from a retail entity operating the sales vehicle. The location demographic information, in part, can include for example information about multiple potential locations to which the sales vehicle could be directed and an assigned location of the potential locations to which the sales vehicle is assigned to be located. Further, the population demographic information can include, for example, information about numerous potential customers that have a relationship with the assigned location.

Figure 1:
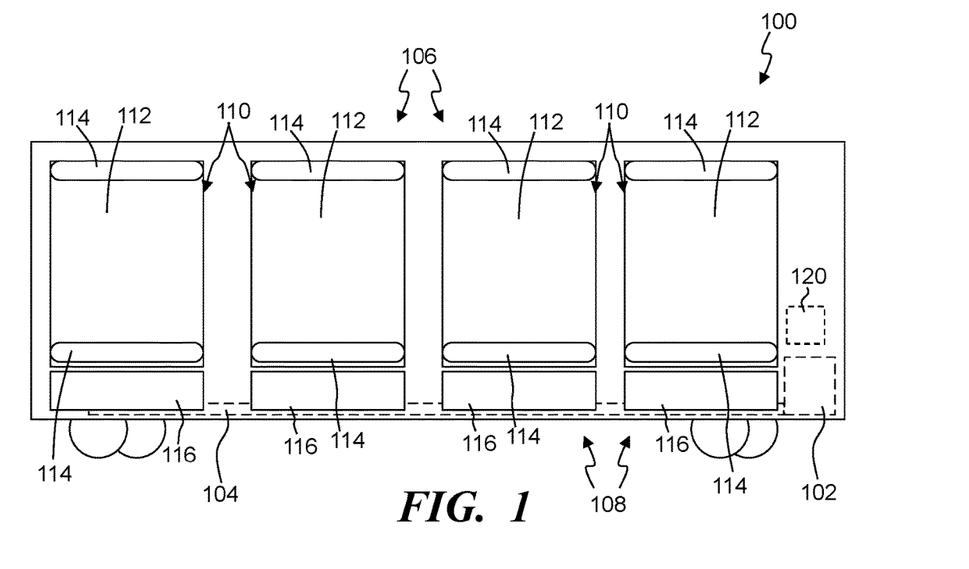
FIG. 1 illustrates a simplified plane view of a mobile sales vehicle showing a first exterior side of the sales vehicle, in accordance with some embodiments.
Figure 2:
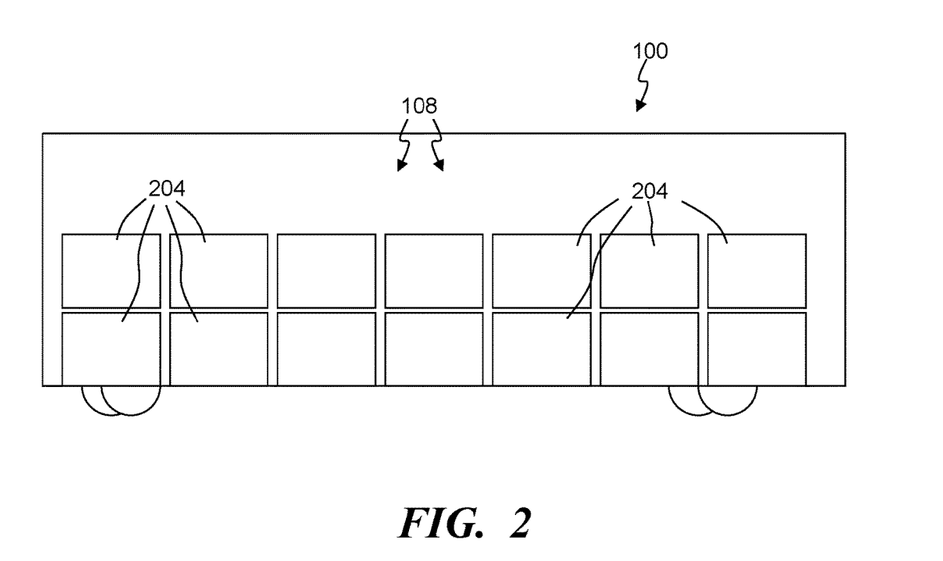
FIG. 2 illustrates a simplified plane view of the sales vehicle of FIG. 1 showing an exterior second side, in accordance with some embodiments.
Figure 3:
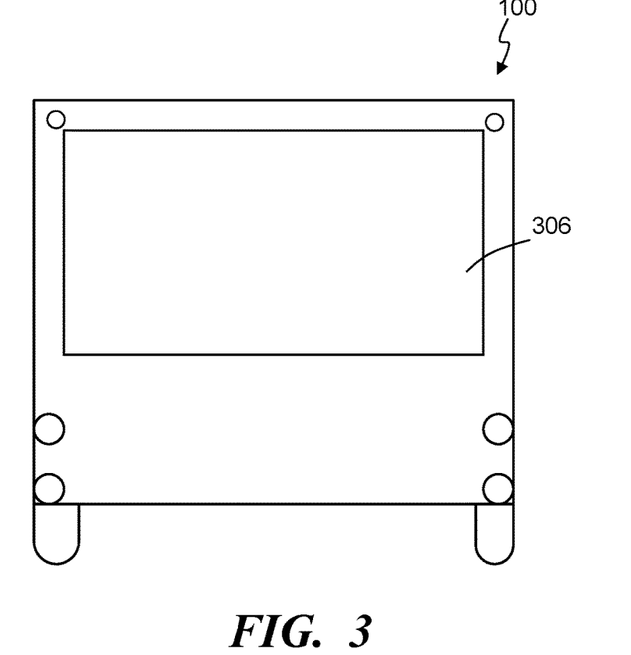
FIG. 3 illustrates a simplified plane view of the sales vehicle of FIG. 1 showing an exterior end of the vehicle, in accordance with some embodiments.
Figure 4:
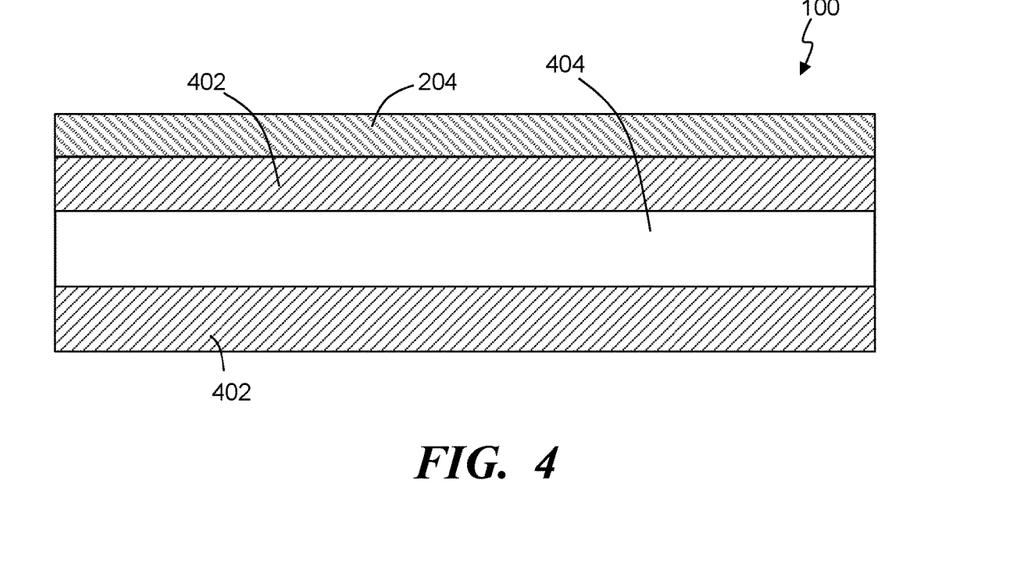
FIG. 4 shows a simplified, overhead, cross-sectional view of the sales vehicle, in accordance with some embodiments.

FIG. 1 illustrates a simplified plane view of a mobile retail system or mobile product sales vehicle 100 showing a first exterior side of the sales vehicle, in accordance with some embodiments. FIG. 2 illustrates a simplified plane view of the sales vehicle 100 of FIG. 1 showing an exterior second side, in accordance with some embodiments. FIG. 3 illustrates a simplified plane view of the sales vehicle 100 of FIG. 1 showing an exterior end of the vehicle, in accordance with some embodiments. FIG. 4 shows a simplified, overhead, cross-sectional view of the sales vehicle 100, in accordance with some embodiments. Referring to FIGS. 1-4, the sales vehicle 100 is mobile allowing the sales vehicle to be transported to an intended location to provide customers with convenient access to products without having a brick-and-mortal shopping facility at the location where the sales vehicle is temporarily parked. Further, the mobile sales vehicle can be placed at locations where a brick-and-mortal shopping facility could not be placed, and/or where it may not be economically beneficial to have a brick-and-mortal shopping facility. The mobile sales vehicle, however, can be moved to convenient locations for customers and enable a plurality of products to be available for purchase at the selected and assigned location. In some implementations, the sales vehicle includes an engine 102 and corresponding drivetrain 104 to enable independent movement of the sales vehicle to selected one or more locations of different potential locations. In other instances, the sales vehicle may be towed to a selected location by a separate vehicle. The sales vehicle 100 includes product storage 402 that stores numerous pre-selected products that are available to be purchased and/or retrieved by customers. The sales vehicle further includes one or more point of sales systems 106, and a product distribution system 108. Further, some embodiments include a driving control system 120 that cooperates with the engine and one control system cooperated with the steering system of the vehicle to provide control over the movement of the vehicle.

Typically, at least one point of sales system 106 is accessible to customers from an exterior of the sales vehicle. In some implementations, each point of sale system is cooperated with one or more sales system control circuits that coordinates sales through the sales vehicle. The sales system control circuit and/or the one or more point of sale systems may further be configured to cause an update to a local inventory system and/or database in response to sales and/or customers collecting previously purchased products. Still further, in some applications, the sales system control circuit and/or the point of sale systems 106 may communicate sales to an external inventory system (e.g., an inventory system of a retailer with which the sales vehicle is associated, an inventory system of distribution center with which the retailer and/or the sales vehicle is associated, or other such inventory system).

In some embodiments, the point of sales system 106 includes a plurality of customer terminals 110 that are accessible to the customers. The customer terminals are configured to allow customers to interact with at least the point of sales system. Typically, each customer terminal 110 includes a display 112 that allows customers to view products and/or browse at least the local inventory of products at the sales vehicle, and in some instances browse products available from remote sites, such as a shopping facility, distribution center, or the like associated with the sales vehicle, an e-commerce website associated with the sales vehicle, other retailers and/or product sources, or a combination of two or more of such sources. In some embodiments the display 112 comprises a touch screen allowing customers to interact with the system. Additionally or alternatively, one or more user interfaces may, in some implementations, additionally be cooperated with the point of sale system providing the customer with one or more input devices such as buttons, knobs, switches, touch sensitive surfaces, mouse, track ball, and so on.

Some embodiments further include one or more cameras 114 that can capture images and/or video of the customers. In some implementations, one or more cameras 114 may be associated with each terminal and/or display 112. The images and/or video can be processed by one or more image and/or video processors to identify customers, track customers' movements and the like. Accordingly, in some implementations, the user interface includes tracking customers' movements allowing the customers to interact with the sales vehicle and point of sale systems through the tracking of user movements such that the user does not have to touch a user interface (e.g., touch screen, mouse, touch pad or the like), and/or the customer has to touch the user interface less. The movements may be tracked by recognizing one or more of the customer's face and hands and tracking the movement of the head and/or hand/s over multiple frames of video, and/or through one or more known techniques.

One or more image processing systems can couple with the cameras 114 of the customer terminals to process the images and/or video. The image processing can include recognizing movements by the customer to allow the customer to interact with the point of sale system, and in some instances interact with the point of sale system without having to touch the display 112 or other inputs. In some embodiments, the image processing system is further configured to detect one or more predefined movement gestures performed by the customer and identify one or more commands corresponding to the one or more predefined movement gestures. Further, the gestures may correspond to information displayed at the corresponding customer terminal when (or within a threshold time) the gesture is performed or recognized (e.g., gesture of pressing a button that is displayed, shaking of the customer's head in response to a question on the display, a swipe of the hand to advance through displayed products, and/or other such commands that may correspond to the information displayed at the time the gesture is performed). The one or more commands can be communicated to a control circuit to cause the one or more commands to be implemented. Similarly, some embodiments further include an audio processing system cooperated with the customer terminals. The audio processing system receives audio voice input from a customer and detected by one or more microphones. The audio is processed and can be used to detect and recognize one or more commands from the audio voice input. Again, the command may correspond with information and/or content displayed on the display at the time (or within a threshold time) the command is received. The command can be forwarded to a control circuit to cause the one or more commands to be implemented.

Further, some embodiments are configured to perform facial recognition and/or voice identification. The image and/or video processing may process images and identify a face of the customer. Similarly, the audio processing system can receive audio voice input from a customer. The audio voice input may be one or more predefined terms or in some applications may be any input that can be processed. A customer may be identified through voice recognition and/or facial recognition. For example, an image of the customer and/or facial recognition data may be stored in a customer profile and/or otherwise associated with a customer. Similarly, one or more prerecorded audio inputs may be maintained and/or voice recognition data can be stored relative to the customer and/or customer profile. This data can be used to compare to image processing and/or audio processing performed on images and/or audio captured at the sales vehicle and used to identify and/or confirm an identification of a customer. Having identified a customer, the system can access customer information (e.g., customer profile, purchase history, pending product orders, etc.). Similarly, the customer identification may be confirmed prior to allowing a customer to acquire a prescription that was pre-ordered.

Still further, in some implementations the point of sales system and/or terminals can communicate (wired and/or wirelessly) with a customer's portable user interface unit (e.g., smart phone, tablet, cellular phone, etc.). The customer can use the user interface unit as a user interface to the point of sale system while product information and/or other information is displayed on the display 112. In some instances, the user interface unit activates one or more software applications (APP) on the user interface unit that established a secure communication with the point of sale system and allows the customer to interact with the point of sale system. The APP may be specific to the sales vehicle, or may be a more general APP such as an APP associated with a retailer or shopping facility that provides other functionality associated with the retailer and/or shopping facility (e.g., maintaining a customer profile, providing discounts, advertising specials, etc.). The display 112 can display relevant product information that the customer may be interested while allowing the customer to navigate through product information, sales information and the like using the user interface unit. Similarly, the user interface unit may be used to display private information, payment information, prescription information, and/or other information that a customer may not want displayed.

The point of sale system may further include one or more methods of payment. For example, a credit card reader may be associated with the point of sale system, the point of sale system may accept cash, or other such methods of payment. Additionally or alternatively, the customer may pay through a customer account and/or profile, pay through their user interface unit, or the like. Still further, in some implementations one or more workers may be working at the sales vehicle and can collect payment from customers.

Again, the sales vehicle includes a product distribution system 108 that allows customers to retrieve purchased products. In some instances, a product distribution system is coupled with each of the point of sales systems. The product distribution system may include one or more dispensing bin 116, drawers, outlets or the like that is accessible to customers from exterior of the sales vehicle and through which the customers can retrieve their products. The dispensing bins can cooperate with an input that is interior to the sales vehicle and through which the products can be inserted. The insertion of the products can be implemented by a worker based on a notification of a purchase (e.g., display to the worker a notification of the product or products purchased and a dispensing bin corresponding to a terminal from which the product is purchased). In other instances, the product distribution system includes one or more automated systems (e.g., robotic arms, conveyor belts, motor driven screw drives, etc.) that can move products from the product storage to the intended dispensing bin 116. In some implementations the product storage of the sales vehicle may additionally or alternatively include one or more self-service product storage units 204, lockers, boxes, etc. Similar to the dispensing bins, each of the storage units is directly accessible by customers from an exterior of the sales vehicle. The storage units in some implementations further cooperate with an input that is accessible from an interior of the sales vehicle and through which products can be added to the storage unit.

In some implementations, products can be moved from the product storage to a dispensing bin 116 or a storage unit 204 in response to a product being purchased by a customer. Additionally or alternatively, pre-ordered products that have been pre-ordered by one or more customers can be stored in one or more of the self-service storage units 204. For example, customers may pre-order products with the intent to retrieve the respective pre-ordered products from one of multiple sales vehicles. During the pre-ordering, the customer through a user interface may be provided with an option to retrieve the product from a mobile sales vehicle 100. The customer may select, through the user interface, a particular location corresponding to one of the locations a sales vehicle 100 is expected to be assigned. In some instances, the product order system may instead notify the customer of the assigned location where the sales vehicle is going to be. For example, the customer may designate a particular geographic area and/or the product order system may already know one or more geographic areas that the customer often visits and/or passes through, and can select one of these locations or allow the customer to select one of these location from a listing of locations (which may also be associated with a timing for when the customer may pick up the product from the sales vehicle). Further, the customer and/or sales system may specify a date and/or time when the customer would like to pick up the product from the designated location or will be available to be picked up at the designated location.

The customer can be notified of the correct storage unit from which to retrieve the one or more products purchased. One or more, or all of the storage units may include a locking system that prevents access at least from the exterior of the sales vehicle without the storage unit being unlocked by the point of sales system, a correct pass code, password, confirmation of customer (e.g., receiving a wireless communication from the APP on the customer's user interface unit, entering a customer ID, using a card reader to read a customer's government issued identification or credit card, or other such identifier), or the like. In some implementations, the point of sales system communicationally couples with each of the storage units and is configured to issue an unlock command to cause a respective one of the storage units to activate the locking system to unlock. For example, the customer may interact with a customer terminal 110 and notify the sales vehicle that they are present at the vehicle (e.g., providing a confirmation, facial recognition, swiping a credit card, etc.). Similarly, the customer may use their personal user interface unit to communicate with the point of sales system to request the storage unit be unlocked (e.g., wirelessly communicating a GPS coordinate of the user interface unit, establishing a short range wireless communication connection and communicating an identifier of the user interface unit, entering a pass code or other identifier, etc.). Again, the point of sales system may further utilize pass codes to allow access to the storage units. An interface can be associated with one or more storage units and the customer can enter the pass code and the corresponding one or more storage units can unlock. Further, an indicator (e.g., light) can identify which storage unit or units have been unlocked. Further, the pass codes can be changed every time a storage unit is opened and/or every time a product order is placed into a storage unit. The storage unit identifier and/or pass code may be provided at the time of purchase (e.g., displayed on the display 112, communicated to a customer's user interface unit, etc.), or otherwise provided at a time prior to a customer accessing the storage unit.

Further, in some embodiments, the product distribution system 108 includes a control circuit configured to authorize access by a customer to one or more products stored in the product storage and purchased by the customer. Again, the authorization may include directing a worker, robot, conveyer, etc., to place a product into a dispensing bin 116, a storage unit 204, or instructing a worker at the sales vehicle to provide the customer with the purchased product. Similarly, the authorization may further include notifying a customer of a pass code, and in some instances programming a lock of a storage unit with the pass code, receive a pass code from a lock, or the like.

In some embodiments, the sales vehicle further includes one or more customer service windows 306 that allow a worker on an interior of the sales vehicle to interact with customers exterior to the vehicle. The worker can be part of the product distribution system by receiving notification of a product that a customer purchased so that the worker can retrieve the product and provide the customer with the product. Additionally, in some instances, the worker may receive payment for one or more products requested by a customer through the point of sale system (e.g., receiving cash, swiping a credit card, debiting a debit card or gift card, and the like).

Some embodiments include one or more temperature control system that cooperate with one or more interior product storage units and/or the exterior accessible storage units 204, and are configured to control the temperature within the one or more storage units. In some instances, individual temperature control systems may be cooperated with a single storage unit and control the temperature within that one storage unit, while in other instances, a temperature control system may cooperate with multiple storage units and individually or collectively control the temperature in one or more of the multiple storage units. Accordingly, one or more storage units may be reserved for cold temperatures (e.g., below 32° F.), some storage units may be reserved for cool temperatures (e.g., below 40° F.), some storage units may be reserved for warm temperatures (e.g., greater than 130° F.), or other such temperatures. In other instances the temperature is controlled based on one or more products placed within a storage unit. Further, the product distribution system may include a control circuit that identifies a desired storage temperature of a product and activates a temperature control system associated with the storage unit in which the product was placed to maintain the temperature at or within a threshold of the desired storage temperature. Thermostats can be incorporated into those temperature controlled storage units to provide feedback to the temperature control system.

The products can be stored in product storage 402 that can be distributed through the vehicle. For example, the vehicle may include a walkway 404 with product storage on either side of the walkway. The walkway allows workers access to load and unload products to and from the vehicle. Further, a worker working at the vehicle may move down the walkway to review one or more products requested by customers.

As introduced above, the assigned location that a sales vehicle is assigned is typically selected based on multiple factors. Many of the factors are dependent on geographic and/or location demographic information and/or population demographic information. Similarly, products are pre-selected to be placed onto a given sales vehicle as a function of the assigned location, geographic and/or location demographic information, and/or population demographic information. Accordingly, product storage of the sales vehicle is populated with and configured to store pre-selected products that are selected in response to an evaluation of location demographic information that includes information about multiple potential locations to which the sales vehicle could be directed and an assigned location of the potential locations to which the sales vehicle is assigned to be located. Further, the products are typically also pre-selected in response to and based on an evaluation of population demographic information including information about numerous potential customers that have a relationship with the assigned location. Again, the pre-selected products include a sub-set of potential products available from a retail entity associated with and/or operating the sales vehicle.

The location demographic information can include information about multiple different potential locations to which one or more sales vehicles 100 could be directed. In some instances, the location demographic information can further include an assigned location of the potential locations to which the sales vehicle is assigned to be located. The location demographics information includes information that are predicted to have an effect on potential sales through a sales vehicle. For example, location demographics can include one or more of, but is not limited to, locations where it is legal to part a sales vehicle, sales vehicle visibility relative to foot and/or automobile traffic, distance and/or orientation relative to positions of mass transit (e.g., train stations, subway stations, bus stations, freeway entrances, etc.), location accessibility by foot and/or automobile, availability of parking relative to a location, distance and/or orientation relative to a place of entertainment (e.g., football stadium, baseball stadium, race track, movie theater, amusement park, beach, lake, casino, park, sports fields, etc.), calendar information corresponding to events occurring at and/or proximate a location (e.g., football game, basketball game, automobile race, youth sport games, parade, fireworks display, etc.), information regarding traffic (foot, automobile, etc.) relative to potential locations and further corresponding to different days of the week and/or times of the day, and other such information. In some embodiments, the relevant location parameters associated with each location can be designated with a score, and a total location score can be calculated based, for example, on a summation of the total scores. Further, weighting may be applied to one or more scores, such as weightings based on relevance of information relative to predicted correlation to sales. As such, the total location score may be a summation of one or more weighted and/or non-weighted scores. Other evaluations can be considered such as statistical relevance of a location to actual and/or predicted sales, statistical evaluation of multiple different parameters (e.g., mean, standard deviation, etc.), and the like.

Similarly, the population demographics information can include information about individuals and/or groups of individuals that can have an effect on potential sales through a sales vehicle. Further, the population demographics may be associated with location demographic information. The population demographic information can include information about numerous potential customers that have a relationship with a location being evaluated and that typically can have an effect on predicting potential sales. For example, numerous customer profiles can be maintained with information including one or more of, but not limited to, a customer's residence address, a customer's work address, one or more delivery addresses utilized by a customer, locations of one or more shopping facilities the customer regularly visits, estimated and/or known routes of travel (e.g., tracking a customer's movements through GPS coordinates provided by the customer's user interface unit), customer's purchase history information, purchase history that appears to be impulse purchases, historical purchases from a sales vehicle 100, customer's age, customer's gender, number and/or age of other family members, and other such information. Similar population demographics information can be obtained and used regarding other individuals that are not registered customers of the sales vehicle and/or the associated sales entity. This information may be obtained from third party market evaluation entities, other sales services, delivery services, and other such sources. The population demographics can be used in cooperation with location demographics in estimating product sales through a sales vehicle 100, identifying products that are likely to sell at particular locations and/or ranking product sales probability for one or more products, and other such determinations.

The evaluation of the location and/or population demographic information may include (or the demographic information may be obtained with) ranking information or other otherwise associating the information with a relevance factor or value that correspond to predicted likelihood of sales through a mobile sales vehicle 100 at the corresponding location. This ranking information can be used in selecting one or more parameters and/or types of demographic information to be evaluated relative to one or more potential locations to which one or more sales vehicles are to be assigned and/or potential products to be pre-selected and put on the sales vehicle and corresponding to the assigned location. Additionally or alternatively, the ranking information may be used as a weighting factor in the evaluation with higher ranked information expected to have a greater effect on the evaluation than lower weighted factors.

In some embodiments, the population demographics additionally includes the evaluation of products that are purchased by a predicted population that is anticipated to potentially purchase products from a mobile sales vehicle 100. As such, the popularity, frequency, and/or quantity of products purchased by a predicted potential purchasing population can be identified and considered in determining products to pre-select for one or more particular locations and/or a sale vehicle to be directed to a particular location or locations in a geographic area. The product demographics can further take into consideration products that are predicted to be more readily purchased from a sales vehicle, times of a day a sales vehicle is to be at a location, and other such factors.

Further, in some embodiments, customers can be notified of one or more locations where one or more sales vehicles are scheduled to be located, and typically times when the vehicle is to be at the pre-selected locations that were selected based on the population and/or location demographic evaluations. Additionally or alternatively, customers can access scheduling of the one or more sales vehicles, such as through a website, a mobile implemented on customers' user interface units, and the like. The notification and/or scheduling can specify the pre-selected locations and the times the sales vehicle is scheduled to be at the pre-selected locations. This allows customer to track the locations where one or more sales vehicles are located and/or are scheduled to be located. Similarly, the notifications to customers may be based on a customer's request for notification when a sales vehicle is scheduled to be at one or more customer selected locations, based on a customer's previous visits to one or more sales vehicles, based on a customer's current location, based on a customers' customary route of travel, based on a customers' customary time of travel, and other such information.

As introduced above, some embodiments include a driving control system 120 that provides control over the sales vehicle. In some embodiments, the driving control system enables driving of the vehicle without human intervention. The driving control system includes global positioning processing, sensors, sensor processing and the like that enable the driving control system to control the steering and engine of the sales vehicle. This can allow the sales vehicle to be scheduled to travel to one or more pre-selected locations. The self-driving sales vehicle can make multiple stops at different pre-selected locations in different regions throughout the day and/or night allowing customers to access the sales vehicle. Again, customers can be notified of the self-driven sales vehicle schedule and/or can track the location of the self-driven sales vehicle.

In some embodiments, the driving control system 120 receives a schedule and routing information to one or more assigned and pre-selected locations. This information can include global positioning satellite (GPS) information, routing information, distance information and other such information. Using this information, in cooperation, with sensor information (e.g., distance information, speedometer information, light sensor information, communications from other nearby vehicles, traffic information, and the like), the driving control system can automatically control the self-movement of the sales vehicle without human interaction to move the sales vehicle to the one or more pre-selected locations.

Further, one or more workers may travel with the sales vehicle. The worker may also drive the sales vehicle, may travel with a separate vehicle that tows the sales vehicle, may ride along as the self-driven sales vehicle self-drives to intended pre-selected locations, and/or may travel separate from the sales vehicle and go to the sales vehicle at one or more pre-selected locations. The worker can help customers, move products, load storage units, put products into bins, take orders and provide ordered products, provide some maintenance of the sales vehicle and/or surrounding area, and other such activity. For example, a worker may load one or more storage units while the driving control system 120 drives the sales vehicle to a pre-selected location.

Figure 5:
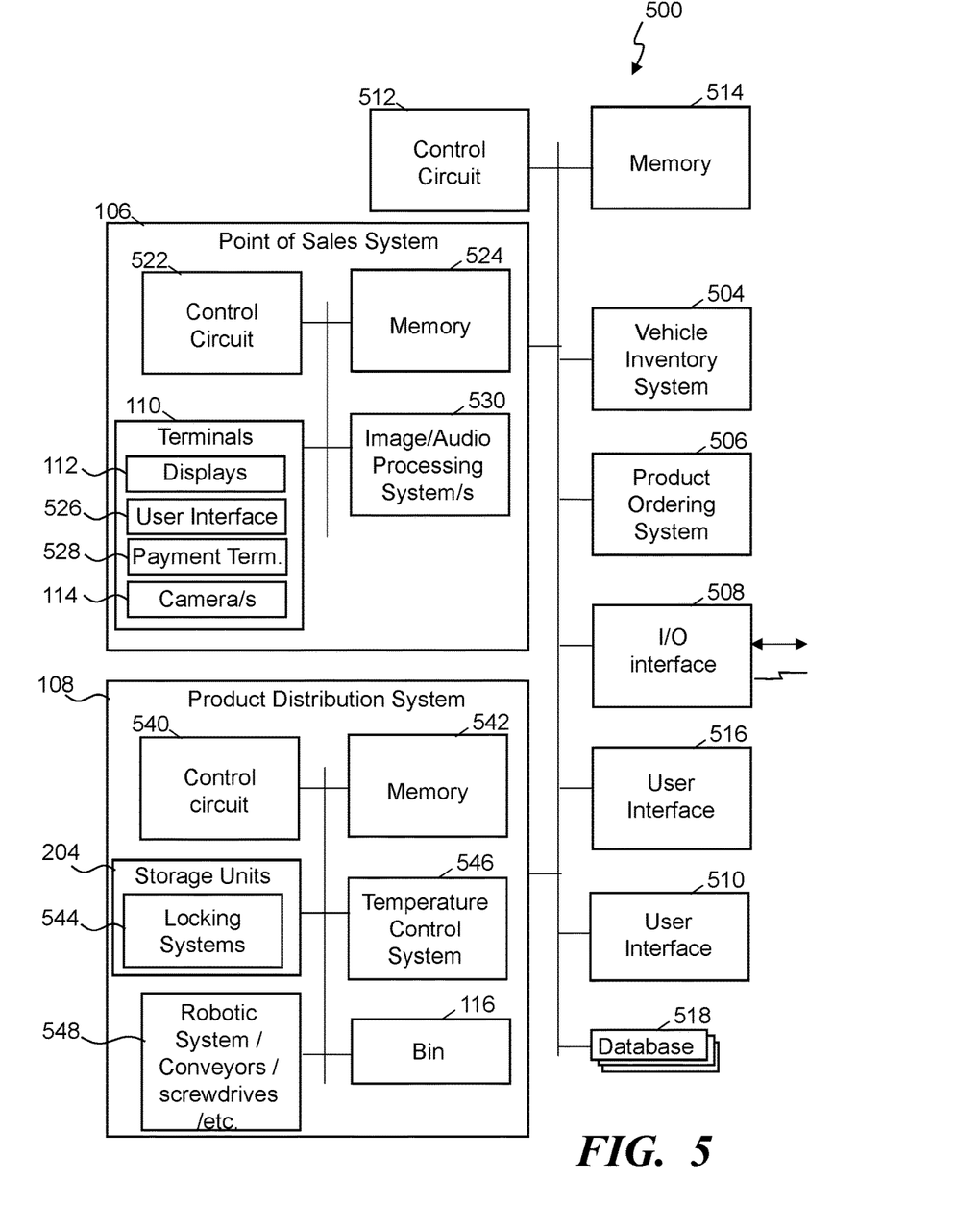
FIG. 5 illustrates a simplified block diagram of an exemplary sales control system that at least in part provides control over the sales and distribution of products through the mobile sales vehicle, in accordance with some embodiments.

FIG. 5 illustrates a simplified block diagram of an exemplary sales control system 500 that at least in part provides control over the sales and distribution of products through the mobile sales vehicle, in accordance with some embodiments. The sales control system 500 includes a point of sale system 106, a product distribution system 108, a local vehicle inventory system 504, a product ordering system 506, and one or more input/output (I/O) interfaces 508. The sales control system 500 can perform one or more functions in providing control over the sale and distribution of products from the mobile sales vehicle. One or more databased 518 may also be maintained at the sales vehicle and/or remotely accessed through the I/O interfaces 508. The databases can maintain product information, inventory information, vehicle location information, and/or other such relevant information. While FIG. 5 illustrates the various components being coupled together via a bus, it is understood that the various components may actually be coupled to the control circuit 512 and/or one or more other components directly.

In some applications, the sales control system 500 optionally includes a control circuit 512 and memory 514. The control circuit 512 can access the memory and implement code stored on the memory to coordinate the operation of the other components of the system and/or provide at least some control over the sales control system. Further, the sales control system 500 typically further includes one or more user interfaces 516 configured to allow workers or other users to interact with the sales control system 500. The control circuit 512 typically comprises one or more processors and/or microprocessors. The control circuit couples with and/or includes the memory 514. Generally, the memory 514 stores the operational code or one or more sets of instructions that are executed by the control circuit 512 and/or processor to implement at least some functionality in coordinating and/or controlling the sales control system 500. Such data may be pre-stored in the memory 514 or be received, for example, one or more distribution centers or facilities, one or more shopping facilities, one or more external or internal inventory systems, an external product ordering system (e.g., operated through a web site, an APP on a user interface unit, etc.), point of sale systems, other sources, or combinations of such sources. In some implementations, the memory further stores code, instructions and corresponding data to allow the sales control system to communicate with a distribution center, a shopping facility, customers' user interface units, internal and/or external databases, and the like. Accordingly, the sales control system typically includes one or more I/O interfaces 508 that allows communication to and from the sales control system.

It is understood that the control circuit 512 may be implemented as one or more processor devices as are well known in the art. Further, the control circuit may utilize remote processors dispersed over a distributed communication network (e.g., WAN, Internet, etc.). Similarly, the memory 514 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 514 is shown as internal to the sales control system; however, the memory 514 can be internal, external or a combination of internal and external memory. In some instances, the control circuit 512 and the memory 514 may be integrated together, such as in a microcontroller, application specification integrated circuit, field programmable gate array or other such device, or may be separate devices coupled together. In some applications, the control circuit 512 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein.

The one or more I/O interfaces 508 allow wired and/or wireless communication coupling of the sales control system to external components, such as one or more product distribution centers, one or more shopping facilities, one or more external inventory systems, an external product ordering system, external point of sale systems, other sources, or combinations of such sources. Accordingly, the I/O interface 508 may include any known wired and/or wireless interfacing device, circuit and/or connecting device, such as but not limited to transceivers, receivers, transmitters, and the like. For example, in some implementations, the I/O interface 508 provides wireless communication in accordance with one or more wireless protocols (e.g., cellular, Wi-Fi, Bluetooth, radio frequency (RF), other such wireless communication, or combinations of such communications).

Again, in some embodiments the sales control system 500 may include one or more user interfaces 516 and/or couple with user interface. The user interface 516 can include substantially any known input device, such one or more buttons, knobs, selectors, switches, keys, touch input surfaces, scanners, displays, etc. Additionally, the user interface may include one or more output display devices, such as display screens, lights, visual indicators, etc. to convey information to a user, such as product information, local inventory information, sales data, assigned location information, status information of components of the sales vehicle and/or sales control system 500, historical information, customer information, graphical user interfaces, purchase information, notifications, errors, conditions and/or other such information.

The point of sales system 106 includes one or more customer terminals 110, and in some embodiments further includes a point of sales control circuit 522 and memory 524. Some embodiments further include and/or couple with one or more image and/or video processing system, and/or audio processing system 530. While FIG. 5 illustrates the various components of the point of sale system 106 being coupled together via a bus, it is understood that the various components may actually be coupled to the point of sales control circuit 522 and/or one or more other components directly.

The point of sales control circuit 522 can access the memory 524 and implement code stored on the memory to coordinate the operation of the other components of the point of sales system 106 and/or provide at least some control over the point of sales system 106. The point of sales control circuit 522 can be implemented through one or more processors and/or microprocessors similar to those describe above with respect to the control circuit 512 of the sales control system 500, and the memory 524 can be implemented through one or more memory similar to those describe above with respect to the memory 514 of the sales control system 500. The point of sales control circuit can access the memory 524 and implement code stored on the memory to perform the functions of the point of sale system and/or coordinate the operation of the other components of the point of sales system.

As described above, each customer terminals 110 includes a display 112. The customer terminals may further include one or more cameras 114, which may correspond to one of the customer terminals, or a single camera may be associated with multiple customer terminals. The customer terminals 110 may include a user interface 526 that allows a customer to interact with the point of sales system 106 to shop for one or more desired products and initiate a purchase of one or more products. For example, the user interface can include one or more input devices such as buttons, knobs, switches, touch sensitive surfaces, mouse, track ball, and so on, and outputs including the display 112, audio outputs and the like. Further, in some embodiments the point of sales system 106 may include one or more additional user interfaces that allow a worker associated with and/or inside the sales vehicle 100 to interact with and provide at least some control over the point of sales system 106. One or more of the customer terminals may additionally include a payment terminal or system 528 configured to receive payment from a customer for purchased products. The payment terminals may include credit card swipe systems (e.g., to read and communicate credit card, debit card, gift card, and other such card information), cash receiving machines, or the like.

In some implementations, customers may additionally or alternatively pay through a customer account or profile that maintains one or more payment methods (e.g., credit card number and corresponding authorization information, debit card that activates the customer to enter a pin number, or the like). The authorization of payment through a customer account may be implemented through the display 112.

In some embodiments, the point of sales system 106 further includes I/O interfaces (not shown) that allow the point of sales system to communication with other components of the sales control system 500. The point of sales system may further utilize one or more of the I/O interfaces 508 to communicate external to the sales control system 500, such as to obtain product information, inventory information, customer information, and the like, and communicate information, such as payment information, purchase information, product information, customer identifier information, and the like. Although FIG. 5 shows the I/O interface 508 as external to the point of sales system 106, one or more of the I/O interfaces may be exclusive to and/or internal to the point of sale system.

The image processing system and/or audio processing system 530 can include one or more processors configured to perform image, video and/or audio processing. The processing can be implemented to detect and track movements of the customer and associate those movements with one or more predefined commands. In some applications, the image and/or video processing systems can be implemented the same as or similar to image and/or audio processing systems of many interactive electronic gaming systems (e.g., Sony PlayStation, Xbox, Wii, etc.).

In some embodiments, the point of sale information may provide information to an external demographics evaluation system that can utilize the information is evaluating products to be included on a sales vehicle at the current location and/or other locations. The demographics information can include one or more of, but is not limited to, products purchased, time of day products are purchased, customer information, weather and/or temperature information, vehicle orientation, precise vehicle location, rates of sales, information regarding a workers performance (e.g., interactions with customers, sales performed and/or supported by the worker, loading and/or unloading storage units 204 and/or bins 116, etc.), image and/or video data, audio data, image and/or video processing information, audio processing information, and other such information.

The product distribution system 108 can include one or more storage units 204, and one or more bins 116. The product distribution system may additionally include one or more product distribution control circuits 540 and memory 542. In some implementations, the product distribution system is coupled with the point of sales system 106 and authorizes access by a customer to one or more products stored in the product storage and purchased by the customer. Further, in some embodiments, the product distribution system may include one or more robotic systems 548, one or more conveyor systems, one or more screw drive systems, and/or other such mechanisms of retrieving products stored on the sales vehicle that are available for purchase, and that can be retrieved and provided to the customer (e.g., through a bin 116, storage unit 204, or the like). Additionally or alternatively, a worker may receive notification from the point of sales system of one or more purchased products and the worker can retrieve the products and provide the products to the customer (e.g., through the window 306, a bin 116, storage unit 204, other such methods of combination of two or more of such methods). One or more locking systems 544 may cooperate with one or more storage units 204 to provide exterior locking of the one or more storage units (and/or bins 116). The locking systems 544 may be control by the product distribution control circuit 540, the point of sales control circuit 522, and/or the sales system control circuit 512.

The product distribution control circuit 540 can access the memory 542 and implement code stored on the memory to coordinate the operation of the other components of the product distribution system 108 and/or provide at least some control over the product distribution system. The product distribution control circuit 540 can be implemented through one or more processors and/or microprocessors similar to those describe above with respect to the control circuit 512 of the sales control system 500, and the memory 542 can be implemented through one or more memory similar to those describe above with respect to the memory 514 of the sales control system 500. The product distribution control circuit can access the memory 542 and implement code stored on the memory to perform the functions of the product distribution system and/or coordinate the operation of the other components of the product distribution system.

Further, in some implementations, the product distribution system includes and/or is in communication with one or more temperature control systems 546 that can cooperate with one or more storage units, or other compartments of the product storage within the sales vehicle to control temperature within the one or more storage units and/or compartments. The temperature control system may include one or more refrigeration systems that direct cooled air into and/or around one or more of the storage units and/or compartments. Similarly, temperature control system may include one or more heating systems that direct heated air into and/or around of the storage units and/or compartments, and/or heating elements that heat part of the storage unit and/or compart (e.g., heating element within a storage unit and/or connected to a portion of the storage unit that upon activation generates heat). One or more flow regulators may be cooperated with the system to control air flow that at least in part help to control the temperature. Further, one or more of the storage units and/or compartments can include insulation to help in maintaining a desired temperature and reduce power consumption in maintaining desired temperatures.

Still referring to FIG. 5, in some embodiments the sales control system 500 includes and/or is in communication with the local vehicle product inventory system 504. The vehicle inventory system 504 is provided with inventory information from an external inventory system and/or stocking system. This may be based on a worker scanning products as they are loaded into the sales vehicle 100, based on products specified by an external inventory system to be loaded into the sales vehicle, or other such methods. The vehicle product inventory information is provided to the vehicle inventory system corresponding to each product carried by the sales vehicle 100.

The vehicle inventory system 504 can be communicationally coupled with the point of sales system 106 and/or product distribution system 108 and can communicate with the point of sale system to allow customers at the customer terminals of the point of sale system to access and review available products currently carried on the sales vehicle. Additionally, the vehicle inventory system can receive information about products purchased through the sales vehicle and/or products retrieved from (and/or returned to) the sales vehicle.

The vehicle inventory system 504 can track product information, and maintain and update the vehicle product inventory information and/or an accounting of products on the sales vehicle as products are acquired by customers from the sales vehicle such that product information provided to subsequent customers regarding product inventory on the sales vehicle is accurate. Additionally, in some instances, the vehicle product inventory system further has access to product inventory available through a retail entity (e.g., one or more shopping facilities, one or more distribution centers, ecommerce service, etc.), and not currently available at the sales vehicle. The product inventory system 504 and/or the point of sales system can receive orders from one or more customers for one or more products not currently available at the sales vehicle along with a designation of a method of receiving the ordered product.

Further, the vehicle inventory system may track products sold versus products retrieved. In some instances, a customer at a remote location may purchase a product to be retrieved from the sales vehicle. Accordingly, the remote sales system may communicate that sale to the vehicle inventory system that can reduce the inventory available for sale for the purchased product, while continuing to maintain an accurate count of the total number of products. When the customer later actually retrieves the purchased product, the vehicle inventory system can update the inventory count accordingly.

The vehicle inventory system can further provide inventory information to the point of sales system such that the point of sales system only displays products that are actually available and can be retrieved at the time the customer is at the customer terminal, or display an relevant label corresponding to product information being displayed when there is no longer a product on the sales vehicle available for purchase. The point of sales system may still allow the customer to purchase that product but would have the customer designate a method of later obtaining the product. For example, a set of methods of receiving the product can include, but is not limited to, picking up the ordered product at a later time from a sales vehicle (e.g., at a later time from a sales vehicle at the current location (e.g., pick up tomorrow), at a later time from another sales vehicle at a different location), picking up the ordered product at a sales facility maintained by a sales entity that is associated with and/or maintains the sales vehicle 100, and delivery of the ordered product to a designated delivery location, or the like.

Further, some embodiments may include a product ordering system 506 that allows the customer at the customer terminals to access inventory information that may not be available on the sales vehicle at the time the customer is interacting with the customer terminal to order and/or purchase one or more products. This can include an application that connects with a retailers retail website, or connecting to a separate database and/or website that provides additional features based on the knowledge the customer is at the sales vehicle (e.g., priority delivery, ability to have a product reserved for a sales vehicle at a selected location to be picked up at a later time, and the like). Additionally, the product ordering system 506 may further provide the customer with one or more user interfaces and/or options to select a method of obtaining an ordered product that is not currently available from the sales vehicle. These options may vary depending on one or more factors such as, but not limited to, whether the customer typically visits areas where a sales vehicle may be located, whether the customer regularly visits one or more sales vehicles and/or an associated shopping facility, a level of customer priority and/or level of service for which the customer qualifies, and other such factors, and often a combination of two or more of such factors. For example, the options may include allowing the customer to select that an ordered and/or purchased product be delivered to a specified location, which may include selecting from a displayed list and/or entering an address; requesting the product be placed onto a sales vehicle intended for a selected location to be retrieved at a later date and/or time, again listings of scheduled locations where vehicles are scheduled to be located and corresponding times can be displayed (which may be limited based on a customer's place of residence, work, and/or typical movement patterns); requesting the one or more products be retrieved from a shopping facility, where a listing of shopping facilities may be specified (e.g., within given distance range from a location of the sales vehicle, the customer's home, the customer's work address, etc.); or other such options. In some implementations, some or all of the product ordering system may be implemented remote from the sales vehicle, and the point of sale control circuit 522 and/or the sales control circuitry 512 establish a communication with the remote product ordering system.

Figure 6:
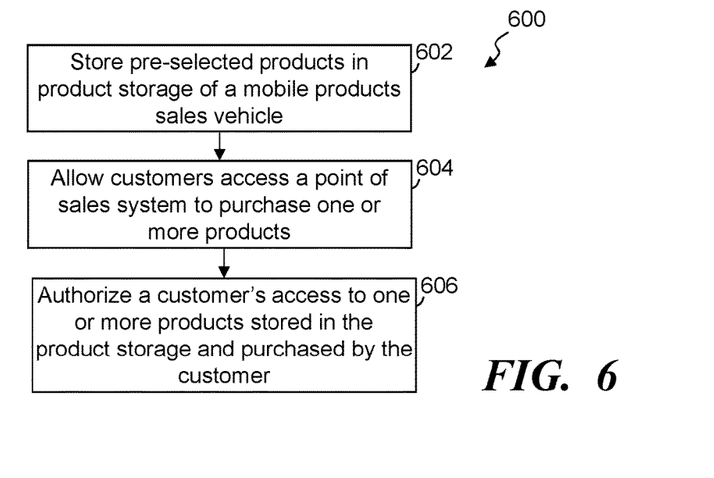
FIG. 6 illustrates a simplified flow diagram of an exemplary process of selling products pre-selected through a mobile sales vehicle and enabling mobile product sales, in accordance with some embodiments.

FIG. 6 illustrates a simplified flow diagram of an exemplary process 600 of selling products pre-selected through a mobile sales vehicle 100 and enabling mobile product sales, in accordance with some embodiments. In step 602, pre-selected products are placed and stored in the product storage of the mobile products sales vehicle 100. The pre-selected products are selected in response to an evaluation of location demographic information comprising information about multiple potential locations to which the sales vehicle could be directed and an assigned location of the potential locations to which the sales vehicle is assigned to be located, and/or in response to an evaluation of population demographic information comprising information about numerous potential customers that have a relationship with the assigned location. Typically, the pre-selected products comprise a sub-set of potential products available from a retail entity operating the sales vehicle and/or otherwise associated with the sales vehicle.

In some embodiments, the pre-selection of products can further include products that have previously been purchased by one or more customers that have been scheduled to be picked up by a customer at or near an assigned or pre-designated location. As described above, in some instances one or more products a customer wants to purchase may not be available at a sales vehicle at the time the customer is trying to purchase the product. Some implementations provide the customer with the option of pre-purchasing and/or pre-ordering the product and designating that the customer would like to pick up that product from a sales vehicle at or near a selected location. Accordingly, when pre-selecting products to be loaded onto the sales vehicle, some implementation further identify products that have been requested and/or purchased by one or more customers. These products may be stored in the general product storage area. One or more of the products, however, may be reserved for a particular customer and put into a reserve product storage area and/or placed into a storage unit 204.

In step 604, customers are allowed to access a point of sales system 106, such as a customer terminal 110. Through the point of sale system the customers can review product information and purchase one or more products currently available on the mobile sales vehicle 100 while at the assigned location, and/or purchase products that are not on the sales vehicle. In step 606, a customer is authorized to access, through the product distribution system 108 of the sales vehicle, to one or more products stored in the product storage and purchased by the customer. This access can be through the bins 116, storage units 204, provided by a worker through the window 306, or the like. For example, some embodiments enable customers with direct exterior access to multiple self-service storage units 204 storing pre-ordered products that have been pre-ordered by one or more customers with the intent to retrieve respective pre-ordered products from one of multiple sales vehicles to be assigned to the assigned location, and/or to products just purchased by the customer (e.g., through one of the customer terminals 110, through a user interface unit, or the like). The access to the storage unit can include issuing an unlock command to a locking system 544 of a respective one of the storage units 204 to activate the locking system to unlock the respective one of the storage units.

As described above, some embodiments enable customers with access to and to interact with a plurality of customer terminals 110 that are fixed with the sales vehicle 100 allowing the customers to interact with at least the point of sales system 106 through one of the plurality of customer terminals. In some implementations, the customer terminals include a display 112 and one or more cameras 114 that correspond to the corresponding display. The cameras 114 can capture images and/or video that is provided to an image and/or video processing system 530. Movements by the customer can be recognized through the image processing system coupled with one or more cameras 114. In some instances, the recognition of movements allow the customers to interact with the point of sale system without having to touch the display or other inputs. For example, the recognized movements can be associated with one or more predefined commands, and the commands can be issued to the relevant component of the sales control system 500 and/or an external system. Some embodiments may further receive audio information and/or comments. For example, audio voice input can be received and/or detected from a customer, such as through one or more microphones coupled with an audio processing system 530 cooperated with the plurality of customer terminals. One or more commands can be recognized the audio voice input. The point of sales control circuit 522 and/or another control circuit can cause the first command to be implemented. Additionally or alternatively, one or more predefined movement gestures performed by the customer may be detecting through the image processing system 530. One or more commands corresponding to the one or more predefined movement gestures can be identified by the point of sale control circuit 522, the image processing system 530 or other control circuit. In many instances, the identified command may further depend on the information displayed on a display 112 of a customer terminal and/or user interface unit. For example, the display may be displaying one or more options, and based on the customer's movements the point of sale system may identify the selection by the customer of one or more of the displayed options. The identified one or more commands can then be implemented. The one or more commands can include one or more of multiple different commands corresponding to viewing product information for multiple different products as the customer shops through the customer terminal, initiating a purchase, placing an order for a product not currently available, requesting additional product information, and the like.

Some embodiments further attempt to identify a customer utilizing a customer terminal 110. For example, some embodiments receive audio voice input from a customer and perform audio processing on the voice input that can be used to recognize the customer. Additionally or alternatively, the cameras can capture images and/or video and through the image processing system perform facial recognition. The customer can then be identified through the facial recognition, and in some instances through both voice recognition and facial recognition.

Some embodiments enable customers with direct exterior access to multiple self-service storage units 204 that store pre-ordered products that have been pre-ordered by one or more customers with the intent to retrieve respective pre-ordered products from one of multiple sales vehicles 100 to be assigned to the assigned location. An unlock command can be issued to a locking system of a respective one of the storage units to activate the locking system to unlock the respective one of the storage units. Additionally or alternatively, the storage units may receive products purchased by customer through a terminal 110. The storage units, in some instances, may include temperature controlled storage units. As such, some embodiments independently control temperatures within each of multiple storage units 204 based on a product stored within the respective storage units. As described above, some embodiment include temperature controlled storage units 204. As such, some embodiments independently control a temperature within each of multiple storage units 204 of the sales vehicle. The temperature control may be predefined such that one or more storage units are scheduled to be maintained at predefined temperatures. In other instances, the temperature can be adjusted, such as being based on a product stored within the respective storage units.

Further, the sales vehicle 100 typically includes a local vehicle product inventory system 504. As such, vehicle product inventory information corresponding to each product carried by the sales vehicle can be maintained local at the sales vehicle. Customers, at the sales vehicle through the point of sale system, are allowed to access and review product information of the available products currently carried on the sales vehicle based on the vehicle product inventory information. Further, the vehicle product inventory information can be locally updated as products are acquired by customers from the sales vehicle such that product information provided to subsequent customers regarding product inventory on the sales vehicle is accurate.

In some implementations the vehicle product inventory system 504 and/or point of sales system 106 allow customers to order products not on the vehicle. The vehicle inventory system 504 may be configured to access, through the I/O interface 508, product inventory information of products available through a retail entity and not currently available at the sales vehicle 100. One or more orders and/or purchased may be received, through the point of sale system of the sales vehicle, from one or more customers for one or more products not currently available at the sales vehicle. Further, a designation of a method of receiving the ordered product may also be received, such as a selection from a set of methods of receiving the product. The set of methods can comprise picking up the ordered product at a later time from a sales vehicle, picking up the ordered product at a sales facility maintained by the sales entity, and delivery of the ordered product to a designated delivery location. For example, in some instances the sales vehicle may subsequently pick up the ordered product at a sales facility maintained by the sales entity (e.g., a retail sales facility, a chain of retail sales facilities and/or distribution centers, an on-line retailer, a facility that manages one or more mobile sales vehicles, other such entities), and allow the customer to later pick up the product at a selected location of a sales vehicle.

Further, in some embodiments the sales vehicle may receive a schedule and routing information to one or more pre-selected locations. A driving control system may use this information to automatically control the self-movement of the sales vehicle without human interaction to move the sales vehicle to the one or more pre-selected locations. This allows the sales vehicle to be independently moved to one or more locations and provide customers with access to the sales vehicle.

Figure 7:
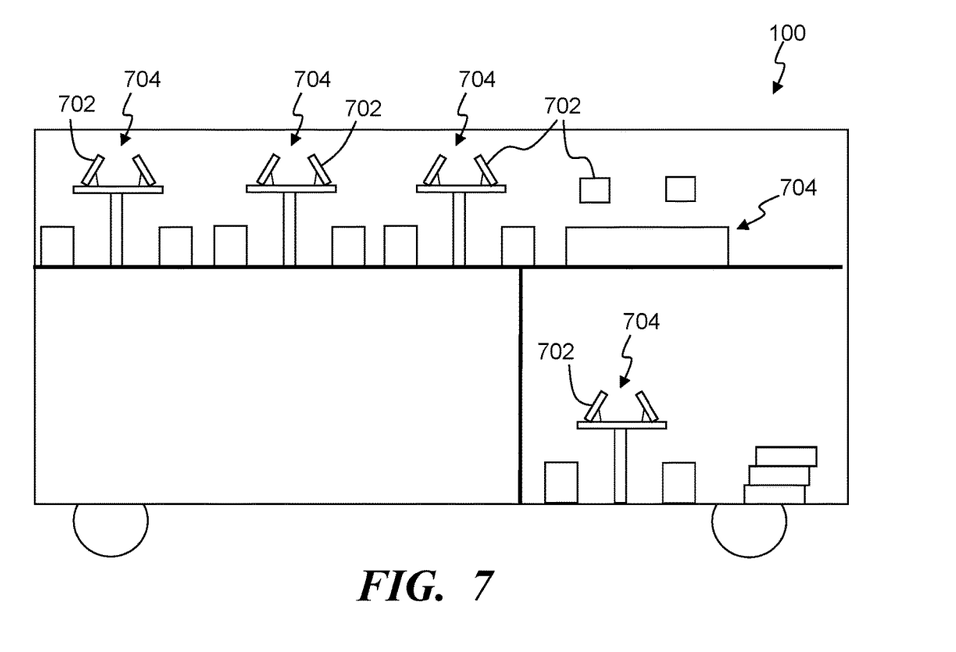
FIG. 7 illustrates a simplified side, cross-sectional view of an exemplary sales vehicle, in accordance with some embodiments.

FIG. 7 illustrates a simplified side, cross-sectional view of an exemplary sales vehicle 100, in accordance with some embodiments. In some implementations, the sales vehicle 100 can further provide shopping experiences through individual customer terminals 702 that may be positioned near and/or fixed to sales vehicle seating areas 704, which may include tables. Customers can utilize these personal customer terminals 702 that are wired and/or wirelessly connected with the product inventory system and/or the point of sales system 106. Stairs and/or a lift may be provided to allow customers to access an upper level of the sales vehicle when an upper level is included. Additionally or alternatively, the sales vehicle can further provide through a wired and/or wireless network router a limited wireless and/or wired network that customers are authorized to access. Some embodiments may additionally provide seating exterior to and around the sales vehicle.

In some applications, the sales vehicle may further offer customers beverages and/or food that are ready to be consumed and that may be consumed while the customer shops (e.g., while at a seating area) and/or after the customer leaves the sales vehicle. For example, the customers may purchase various types of coffee drinks, sodas, energy drinks and/or other such drinks, and pastries, sandwiches, and other such food. Customers may order their drink and/or food through a customer terminal 110, a personal customer terminal 702, a user interface unit, and/or one or more workers through the window 306. In some embodiments, one or more drink machines automatically make and/or dispense the ordered drink and/or food. For example, an automated coffee machine may receive the orders through the point of sales system and automatically make the requested drink and allow the customer to retrieve the drink. Similarly, an automated system may dispense ordered food. Additionally or alternatively, customers may receive their ordered drinks and/or food from the window 306 or a worker brings them the order at a specified table or seating area.

Once authorized and/or authorization is approved, the customers may use their own user interface units to access the limited wireless and/or wired network. The authorization may be provided in response to the customer purchasing a drink and/or food, purchasing other products through the sales vehicle, paying for service, having a predefined customer service account through an APP on a user interface unit, and other such methods. As such, the customer may obtain a temporary free subscription while they are at the sales vehicle. The authorization may be limited to those customers that have made a purchase through the sales vehicle. A table and/or seating area may be assigned to the customer.

Typically, the limited network can restrict customers' access to remote sources, services and/or servers to those sources, services and/or servers that the sales entity associated with the sales vehicle wants to allow customers to access. This may include access to shop for products at the sales vehicle, products available from the corresponding entity, or other such related product sources. Similarly, some embodiments may provide access to multimedia content while at the sales vehicle through the personal customer terminals 702 and/or user interface units. The multimedia content may include books and/or magazines that may be preselected based on customer and/or location demographics. For example, some embodiments may provide access to text books or portions of text books when the sales vehicle is temporarily positioned near a university or high school. Similarly, some embodiments may provide access to television shows, movies, music, and/or other multimedia content while the customer is at or within a threshold distance of the sales vehicle. The multimedia content may include trending and/or popular multimedia, pre-release multimedia that have not yet been released to the public, material that is not intended to be made public, and the like. For example, the sales entity may contract with a multimedia content owner to limit distribution and create a demand for use of that multimedia content at the sales vehicle. Customers can check-out multimedia content and use the content while at or near the sales vehicle. In some instances, the sales vehicle may include paper versions of some books, magazines and the like.

As introduced above, in some embodiments, customers can track where one or more sales vehicles are located and/or scheduled to be at one or more times. Based on the schedule, the customer can go to the sales vehicle to access the network and/or content. In some implementations, the sales vehicle includes a driving control system 120 allows self-driving of the sales vehicle. In some instances, customers may submit reservations and/or reserve content and/or seating area to ensure she/he has access to the desired media content and/or seating area. For example, the customer may access sales vehicle information through a software application (APP) implemented on her/his user interface unit, access information through a website, or the like. The reservation may include a fee or may be restricted to priority customers.

In some embodiments, systems, apparatuses and methods are provided to enhance customer service through the distribution of mobile sales vehicles. In some embodiments, mobile product sales vehicles are provided that comprise: an engine and a drivetrain enabling independent movement of the sales vehicle to different locations; a point of sales system; product storage configured to store pre-selected products selected in response to an evaluation of location demographic information comprising information about multiple potential locations to which the sales vehicle could be directed and an assigned location of the potential locations to which the sales vehicle is assigned to be located, and in response to an evaluation of population demographic information comprising information about numerous potential customers that have a relationship with the assigned location, wherein the pre-selected products comprise a subset of potential products available from a retail entity operating the sales vehicle; and a product distribution system coupled with the point of sales system and comprising a control circuit configured to authorize access by a customer to one or more products stored in the product storage and purchased by the customer.

Some embodiments provide methods of enabling mobile product sales, comprising: storing, in product storage of a mobile products sales vehicle, pre-selected products selected in response to an evaluation of location demographic information comprising information about multiple potential locations to which the sales vehicle could be directed and an assigned location of the potential locations to which the sales vehicle is assigned to be located, and in response to an evaluation of population demographic information comprising information about numerous potential customers that have a relationship with the assigned location, wherein the pre-selected products comprise a sub-set of potential products available from a retail entity operating the sales vehicle; allowing customers to access a point of sales system and to purchase one or more products currently available on the mobile sales vehicle while at the assigned location; and authorizing access, through a product distribution system of the sales vehicle and coupled with the point of sales system, by a customer to one or more products stored in the product storage and purchased by the customer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A mobile product sales vehicle, comprising:
an engine, a steering system, and a drivetrain enabling independent movement of the sales vehicle to different locations;
a driving control system comprising global positioning processing, sensors, and sensor processing, wherein the driving control system provides self-driving of the sales vehicle and couples with the engine and the steering system of the sales vehicle to automatically control the self-movement of the sales vehicle without human interaction;
a point of sales system;
product storage configured to store pre-selected products selected in response to an evaluation of location demographic information comprising information about multiple potential locations to which the sales vehicle could be directed and an assigned location of the potential locations to which the sales vehicle is assigned to be located, and in response to an evaluation of population demographic information comprising information about numerous potential customers that have a relationship with the assigned location, wherein the pre-selected products comprise a sub-set of potential products available from a retail entity operating the sales vehicle;
a vehicle product inventory system communicatively coupled with a remote sales system, wherein the vehicle product inventory system is configured to maintain vehicle product inventory information of inventory on the sales vehicle and further configured to receive a communication from the remote sales system that a first product on the sales vehicle has been pre-ordered, to reserve at the sales vehicle the first product, and to reduce an available inventory quantity in the sales vehicle for the first product in response to the communication of the pre-order and to maintain an accurate count of a total available number of the first product and other products in the sales vehicle; and
an automated product distribution system coupled with the point of sales system and comprising a control circuit configured to authorize access by a customer to one or more products stored in the product storage and purchased by the customer, wherein the product distribution system further comprises:
at least one automated robotic arm positioned to retrieve products from product inventory on the sales vehicle; and
at least one conveyor system to direct the retrieved products to an appropriate customer at the sales vehicle requesting the corresponding product;
wherein the point of sale system comprises a wireless transceiver and is configured to wirelessly communicate with an application executed on a portable first user interface unit exclusively associated with a first customer and receive from the application a confirmation confirming an identification of the first customer; and
wherein the point of sales system is configured to wirelessly communicate private information associated with the first customer to the portable first user interface unit exclusively associated with the first customer based on the confirmation to cause the portable user interface unit to display the private information associated with the first customer that is not to be displayed on a display of a first customer terminal of the sales vehicle.

2. The sales vehicle of claim 1, further comprising:
a plurality of customer terminals, comprising the first customer terminal, each configured to allow customers to interact with at least the point of sales system, wherein each of the plurality of customer terminals comprising a display and one or more cameras corresponding to the corresponding display; and
an image processing system coupled with the one or more cameras of the plurality of customer terminals and configured to recognize movements by the customer allowing the customer to interact with the point of sale system without having to touch the display or other inputs.

3. The sales vehicle of claim 2, further comprising:
an audio processing system cooperated with the plurality of customer terminals and configured to receive audio voice input from a customer, recognize a first command from the audio voice input and cause the first command to be implemented; and
wherein the image processing system is further configured to detect one or more predefined movement gestures performed by the customer, identify a second command corresponding to the one or more predefined movement gestures and information displayed at the corresponding customer terminal when the one or more predefined movement gestures are performed by the customer, and cause the second command to be implemented.

4. The sales vehicle of claim 2, further comprising:
an audio processing system cooperated with the plurality of customer terminals and configured to receive audio voice input from a customer; and
wherein the image processing system is further configured to perform facial recognition such that a customer is identified through voice recognition and facial recognition.

5. The sales vehicle of claim 1, wherein the product storage further comprises multiple self-service storage units configured to store pre-ordered products that have been pre-ordered by one or more customers with the intent to retrieve respective pre-ordered products from one of multiple sales vehicles to be assigned to the assigned location, wherein each of the storage units is directly accessible by customers from an exterior of the sales vehicle, and wherein each storage unit comprises a locking system that when locked prevents access to the respective storage unit from the exterior the sales vehicle; and
wherein the point of sales system communicationally couples with each of the storage units and is configured to issue an unlock command to cause a respective one of the storage units to activate the locking system to unlock.

6. The sales vehicle of claim 1, wherein the product storage further comprises multiple storage units each configured to store one or more products, wherein the storage units further comprise a temperature control system configured to independently control a temperature within the corresponding storage unit based on a product stored within the storage unit.

7. The sales vehicle of claim 6, wherein the point of sale system is configured to wirelessly receive from the application executed on the portable first user interface unit a request that a first storage unit of the storage units that is temporarily associated with the customer be unlocked; and wherein the point of sale system is further configured to issue the unlock command in response to receiving the request to unlock the first storage unit and receiving the confirmation from the portable first user interface unit to activate the locking system of the first storage unit.

8. The sales vehicle of claim 7, further comprising:
the vehicle product inventory system communicationally coupled with the point of sale system, wherein the vehicle product inventory system is provided with the vehicle product inventory information corresponding to each product carried by the sales vehicle, communicates with the point of sale system to allow customers at the point of sale system to access and review product information of the available products currently carried on the sales vehicle, and to update the vehicle product inventory information as products are acquired by customers from the sales vehicle such that product information provided to subsequent customers regarding product inventory on the sales vehicle is accurate; and
wherein the vehicle product inventory system further has access to product inventory available through the retail entity and not currently available at the sales vehicle, and to receive orders from one or more customers for one or more products not currently available at the sales vehicle and a designation of a method of receiving the ordered product from a set of methods of receiving the product, wherein the set of methods comprises picking up the ordered product at a later time from a sales vehicle, picking up the ordered product at a sales facility maintained by the sales entity, and delivery of the ordered product to a designated delivery location.

9. The sales vehicle of claim 1, wherein the driving control system is configured to receive a schedule and routing information to one or more pre-selected locations, including the assigned location, and automatically controls the self-movement of the sales vehicle without human interaction to move the sales vehicle to the one or more pre-selected locations.

10. A method of enabling mobile product sales, comprising:
storing, in product storage of a mobile products sales vehicle, pre-selected products selected in response to an evaluation of location demographic information comprising information about multiple potential locations to which the sales vehicle could be directed and an assigned location of the potential locations to which the sales vehicle is assigned to be located, and in response to an evaluation of population demographic information comprising information about numerous potential customers that have a relationship with the assigned location, wherein the pre-selected products comprise a sub-set of potential products available from a retail entity operating the sales vehicle;
receiving a schedule and routing information to one or more pre-selected locations, including the assigned location;
autonomously controlling, through a driving control system of the sales vehicle, an engine and a steering system of the sales vehicle and automatically controlling self-movement of the sales vehicle without human interaction to at least the assigned location;
allowing customers to access a point of sales system and to purchase one or more products currently available on the mobile sales vehicle while at the assigned location;
authorizing access, through a product distribution system of the sales vehicle and coupled with the point of sales system, by a customer to one or more products stored in the product storage and purchased by the customer;
activating at least one automated robotic arm positioned to retrieve products from product inventory on the sales vehicle and controlling the at least one automated robotic arm to retrieve the one or more products and to place the retrieved one or more products onto a conveyor system of the sales vehicle;
activating the conveyor system and directing the retrieved one or more products to an appropriate customer at the sales vehicle requesting the corresponding product;
wirelessly communicating with an application executed on a first user interface unit associated with a first customer;
receiving from the application executed on the first user interface unit a confirmation confirming an identification of the first customer;
wirelessly communicating, from the point of sales system, private information associated with the first customer to the first user interface unit exclusively associated with the customer based on the confirmation, and causing the first user interface unit to display private information of the customer that is not to be displayed on a display of a first customer terminal of the sales vehicle;
wirelessly communicating, through a vehicle product inventory system, with a remote sales system;
wirelessly receiving a communication from the remote sales system that a first product on the sales vehicle has been pre-ordered;
reserving at the sales vehicle the pre-ordered product; and
reducing, by the vehicle product inventory system, an available inventory quantity in the sales vehicle for the first product in response to the communication of the pre-order and maintaining an accurate count of a total available number of the first product and other products in the sales vehicle.

11. The method of claim 10, further comprising:
enabling customers access to and to interact with a plurality of customer terminals, comprising the first customer terminal, wherein each of the plurality of customer terminals is fixed with the sales vehicle communicatively coupled with the point of sale systems; and enabling the customers to interact with at least the point of sales system through one of the plurality of customer terminals, wherein each of the plurality of customer terminals comprising a display and one or more cameras corresponding to the corresponding display; and
recognizing, through an image processing system coupled with one or more cameras of the plurality of customer terminals, movements by the customer and allowing the customer to interact with the point of sale system without having to touch the display or other inputs.

12. The method of claim 11, further comprising:
receiving audio voice input from a customer, through an audio processing system cooperated with the plurality of customer terminals;
recognizing a first command from the audio voice input;
causing the first command to be implemented;
detecting, through the image processing system, one or more predefined movement gestures performed by the customer;
identifying a second command corresponding to the one or more predefined movement gestures and information displayed at the corresponding customer terminal when the one or more predefined movement gestures are performed by the customer; and
causing the second command to be implemented.

13. The method of claim 11, further comprising:
receiving audio voice input from a customer;
performing, through the image processing system, facial recognition; and
identifying a customer through voice recognition and facial recognition.

14. The method of claim 10, further comprising:
enabling customers direct exterior access to multiple self-service storage units storing pre-ordered products that have been pre-ordered by one or more customers with the intent to retrieve respective pre-ordered products from one of multiple sales vehicles to be assigned to the assigned location; and
issuing an unlock command to a locking system of a respective one of the storage units to activate the locking system to unlock the respective one of the storage units.

15. The method of claim 14, further comprising:
wirelessly receiving, from the first user interface unit, a request that a first storage unit of the storage units that is temporarily associated with the customer be unlocked; and
issuing the unlock command in response to receiving the request to unlock the first storage unit and the confirmation from the first user interface unit to activate the locking system of the first storage unit.

16. The method of claim 15, further comprising:
independently controlling a temperature within each of multiple storage units, of the sales vehicle, based on a product stored within the respective storage units.

17. The method of claim 10, further comprising:
maintaining, local at the sales vehicle, vehicle product inventory information corresponding to each product carried by the sales vehicle;
allowing customers, at the sales vehicle through the point of sale system, to access and review product information of the available products currently carried on the sales vehicle based on the vehicle product inventory information;
locally updating the vehicle product inventory information as products are acquired by customers from the sales vehicle such that product information provided to subsequent customers regarding product inventory on the sales vehicle is accurate;
accessing product inventory information of products available through the retail entity and not currently available at the sales vehicle; and
receiving, through the point of sale system of the sales vehicle, orders from one or more customers for one or more products not currently available at the sales vehicle and a designation of a method of receiving the ordered product from a set of methods of receiving the product, wherein the set of methods comprises picking up the ordered product at a later time from a sales vehicle, picking up the ordered product at a sales facility maintained by the sales entity, and delivery of the ordered product to a designated delivery location.

18. The method of claim 10, further comprising:
receiving a schedule and routing information to one or more pre-selected locations, including the assigned location; and
automatically controlling, through a driving control system, the self-movement of the sales vehicle without human interaction to move the sales vehicle to the one or more pre-selected locations.

* * * * *